US012768465B2

(12) United States Patent
Ma

(10) Patent No.: US 12,768,465 B2
(45) Date of Patent: Oct. 20, 2026

(54) ROTARY SERVO VALVE

(71) Applicant: SINO DYNAMICS (SHENZHEN) CO., LTD., Shenzhen (CN)

(72) Inventor: He Ma, Shenzhen (CN)

(73) Assignee: SINO DYNAMICS (SHENZHEN) CO., LTD., Shenzhen (CN)

(*) Notice: Subject to any disclaimer, the term of this patent is extended or adjusted under 35 U.S.C. 154(b) by 0 days.

(21) Appl. No.: 19/064,775

(22) Filed: Feb. 27, 2025

(65) Prior Publication Data

US 2025/0198533 A1 Jun. 19, 2025

Related U.S. Application Data

(63) Continuation of application No. PCT/CN2024/101633, filed on Jun. 26, 2024.

(30) Foreign Application Priority Data

Jul. 3, 2023 (CN) ........................ 202310803578.X

(51) Int. Cl.
*F16K 31/04* (2006.01)
*F16K 5/04* (2006.01)
(Continued)

(52) U.S. Cl.
CPC .......... *F16K 31/042* (2013.01); *F16K 5/0407* (2013.01); *F16K 27/065* (2013.01); *F16K 37/0033* (2013.01); *B33Y 80/00* (2014.12)

(58) Field of Classification Search
CPC ............................ F16K 31/042; F16K 31/041
See application file for complete search history.

(56) References Cited

U.S. PATENT DOCUMENTS 5,508,575 A 4/1996 Elrod, Jr.
6,300,739 B1 10/2001 Ratliff et al.
(Continued)

FOREIGN PATENT DOCUMENTS

CN 1661243 A 8/2005
CN 113958551 A 1/2022
(Continued)

*Primary Examiner* — Michael R Reid
(74) *Attorney, Agent, or Firm* — Bayramoglu Law Offices LLC

(57) ABSTRACT

This disclosure relates to a rotary servo valve, including a casing and a valve body, where the valve body is mounted and fixed inside the casing, a rotor valve core is provided inside the valve body, a valve sleeve is provided on the rotor valve core, and an O-ring 1 is provided on a lower end of the valve body; an end cover is provided on an upper end of the casing, a PCBA circuit board is provided inside the end cover, and a plug is provided on an upper end of the end cover; and a bearing 1 is provided on an upper right side of the valve body, and a permanent magnet is provided on an upper end of the bearing 1. For a motor in this disclosure, a position of the motor is controlled by a sensor and using a servo technology. The rotary valve relies on the motor to drive a valve core to rotate within a limited angle to control a flow direction and a flow velocity of a fluid. The valve body, the valve sleeve, and the valve core of this disclosure adopt a creative design and additive manufacturing, which may effectively increase fluid performance, effectively utilize space, reduce waste, and decrease processing volume and the number of parts, achieving an effect of reducing manufacturing costs.

9 Claims, 14 Drawing Sheets

(51) Int. Cl.

| | |
|---|---|
| ***F16K 27/06*** | (2006.01) |
| ***F16K 37/00*** | (2006.01) |
| *B33Y 80/00* | (2015.01) |

(56) References Cited

U.S. PATENT DOCUMENTS

| | | | | |
|---|---|---|---|---|
| 6,407,543 | B1 * | 6/2002 | Hagio | B60K 35/60<br>324/207.2 |
| 11,624,447 | B2 * | 4/2023 | Potter | F16K 11/085<br>137/625.35 |
| 2023/0279955 | A1 * | 9/2023 | Chen | F16K 5/0647<br>251/129.15 |

FOREIGN PATENT DOCUMENTS

| | | | |
|---|---|---|---|
| CN | 116792355 | A | 9/2023 |
| CN | 221779761 | U | 9/2024 |

* cited by examiner

B-B

Valve core remains in middle position

After valve core rotates clockwise

After valve core rotates counterclockwise

ROTARY SERVO VALVE

CROSS-REFERENCE TO RELATED APPLICATION

This disclosure claims priority to Chinese Patent Application No. 202310803578X, filed on Jul. 3, 2023 and entitled "ROTARY SERVO VALVE", the content of which is incorporated herein by reference in their entirety.

TECHNICAL FIELD

This disclosure relates to a servo valve and, in particular, to a rotary servo valve.

BACKGROUND

An electro-hydraulic servo valve is a heart of an electro-hydraulic servo system, with high precision and fast response speed. It is widely used in a high-precision mechatronics system, an aerospace field, and large-scale test equipment. However, an existing servo valve has a heavy weight, large volume, and needs to be improved in power. Therefore, those skilled in the art provide a rotary servo valve to solve problems mentioned above raised in BACKGROUND.

SUMMARY

A purpose of this disclosure is to provide a rotary servo valve to solve problems mentioned above raised in BACKGROUND.

To achieve the above purpose, this disclosure provides the following technical solutions:

A rotary servo valve, including a casing and a valve body, where the valve body is mounted and fixed inside the casing, a rotor valve core is provided inside the valve body, a valve sleeve is provided on the rotor valve core, and an O-ring 1 is provided on a lower end of the valve body; an end cover is provided on an upper end of the casing, a PCBA circuit board is provided inside the end cover, and a plug is provided on an upper end of the end cover; and a bearing 1 is provided on an upper right side of the valve body, a permanent magnet is provided on an upper end of the bearing 1, an O-ring 2 is provided on a left side of the bearing 1, a motor stator is provided on an upper left side of the O-ring 2, a bearing 2 is provided on an upper side of the permanent magnet, and a magnetic encoder is provided on a left side of the bearing 2.

As a further solution of this disclosure: A bearing mounting hole is provided inside the valve sleeve, two symmetrical limit slots are provided on both sides of an upper side of the bearing mounting hole, an O-ring mounting slot is provided on an outer upper side of the valve sleeve, a sharp edge sealing line is provided on a lower side of the valve sleeve, and a vulcanized rubber slot horizontally and vertically communicated is provided on a lower surface of the valve sleeve.

As another further solution to this disclosure: A permanent magnet mounting column is provided on an upper end of the rotor valve core, a bearing mounting column is provided on an upper end of the permanent magnet mounting column, a magnetic encoder mounting hole is provided on a lower side inside the bearing mounting column, and the magnetic encoder is mounted inside the magnetic encoder mounting hole. Two limit structures are provided on a middle position of an outer side of the rotor valve core, the two limit structures are provided in a central symmetrical structure, and a valve core sharp edge sealing line is provided on a lower side of the rotor valve core.

As another further solution of this disclosure: There are two circumferences of waist shaped holes distributed in the circular pattern on the inner circle and the outer circle of the valve sleeve, waist shaped holes along a counterclockwise direction of a first circumference are P5, A3, T5, P6, A4, T6 in sequence, and waist shaped holes along the counterclockwise direction of a second circumference are T7, B3, P7, T8, B4, P8 in sequence; where Pn is communicated with Pn-4 corresponding to the valve body in a close fit, An is communicated with An-2 corresponding to the valve body in a close fit, Bn is communicated with Bn-2 corresponding to the valve body in a close fit, Tn is communicated with Tn-4 corresponding to the valve body in a close fit, and waist shaped holes on an inner cylindrical surface are symmetrically distributed; and where among the waist shaped holes along the counterclockwise direction of the first circumference, P5 and P6 are a pair of small holes, and A3 and A4, T5 and T6 are two pairs of large holes, and among the waist shaped holes along the counterclockwise direction of the second circumference, P7 and P8 are a pair of small holes, and B3 and B4, T7 and T8 are two pairs of large holes.

Compared with the prior art, beneficial effects of this disclosure are as follows.

1. The valve body, the valve sleeve, and the rotor valve core of this disclosure adopt a creative AI design, which may ensure that wall thickness of each part of a flow channel remains consistent and a non-porous process is adopted to significantly reduce raw materials, thereby resulting in light weight, small volume, and high power density. After being processed by a grinding flow process, a 3D printed flow channel of this disclosure is smooth, complete, with low pressure loss, energy saving, and large flow capacity. Compared with a traditional servo valve of a same specification, a rated flow rate of such valve may be increased by 1-2 times.
2. All of the valve body, the valve sleeve, and the rotor valve core of this disclosure are 3D printed. During a printing process, only a very small machining allowance needs to be retained on a machined surface, which may significantly reduce machining amount. The machining amount may be reduced by more than 80%, significantly reducing machining production costs. This disclosure adopts a servo motor to control rotation of the valve core, with fast response speed and high frequency response. The frequency response may reach 300 HZ, far exceeding the frequency response of a traditional servo valve.
3. The rotor valve core of this disclosure is equipped with a high-precision angular displacement sensor, which may provide real-time feedback on angular displacement of the rotor valve core. A circuit board is capable of closed-loop control of displacement of the rotor valve core, which may accurately control an opening of the rotor valve core, resulting in high control accuracy. The valve sleeve of the rotor valve core of this disclosure is printed with a ZrO2 ceramic material, and its hardness may reach 85 HRC after being burned. Even if there are particle pollutants in oil, the hardness of the valve sleeve of the rotor valve core far exceeds that of the particle pollutants in the oil. The particle pollutants will not cause damage to the valve sleeve of the rotor valve core, so such valve has a long service life, strong anti-pollution capacity, and high reliability.

4. The valve sleeve of the rotor valve core of this disclosure will not be in contact. There is no wear on the valve sleeve of the rotor valve core during a rotation process of the rotor valve core. The valve sleeve of the rotor valve core of the traditional servo valve will definitely be in contact, which will be worn out after a period of use, resulting in a low service life and low reliability of the traditional servo valve. Therefore, the service life and the reliability of such valve far exceed those of the traditional servo valve. This disclosure adopts a 3D printing process to produce a rotor iron core, which can reduce materials to the greatest extent possible while ensuring mechanical strength, making the motor rotor lighter and having smaller inertia, resulting in faster response speed for a motor and a valve.
5. The permanent magnet of the motor of this disclosure adopts a structure of a magnetic ring, which eliminates a risk of detachment, reduces distance between two magnetic poles, improves cogging torque of the motor, and enhances accuracy of the motor and the valve. This disclosure designs the casing and a rotor seat as one component (casing), thereby eliminating a risk of oil leakage from a rotor end to a stator end.

Figure 1:
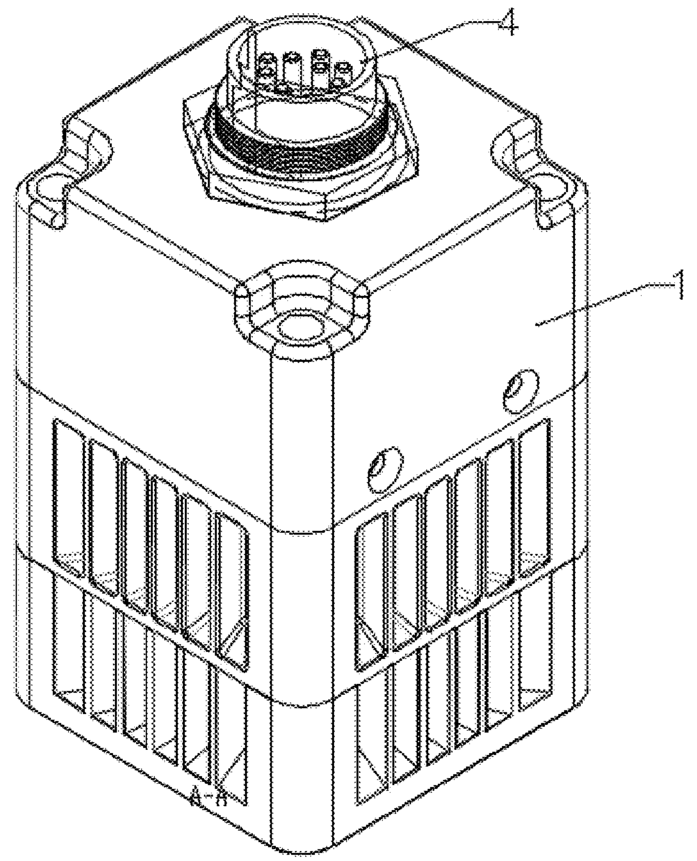
FIG. 1 is a structural schematic diagram of a rotary servo valve.
Figure 2:
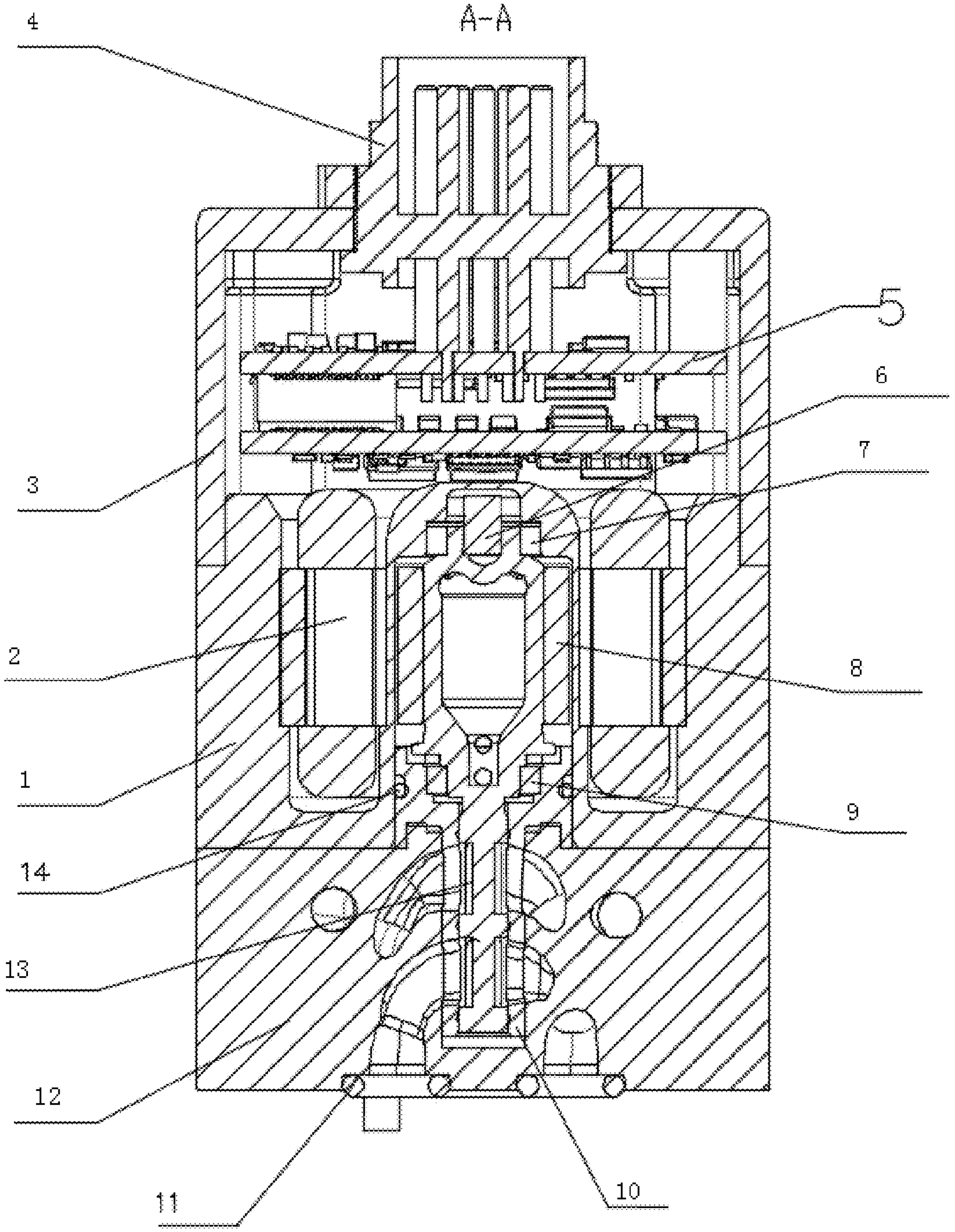
FIG. 2 is a cross-sectional schematic diagram of a rotary servo valve in an A-A direction.
Figure 3:
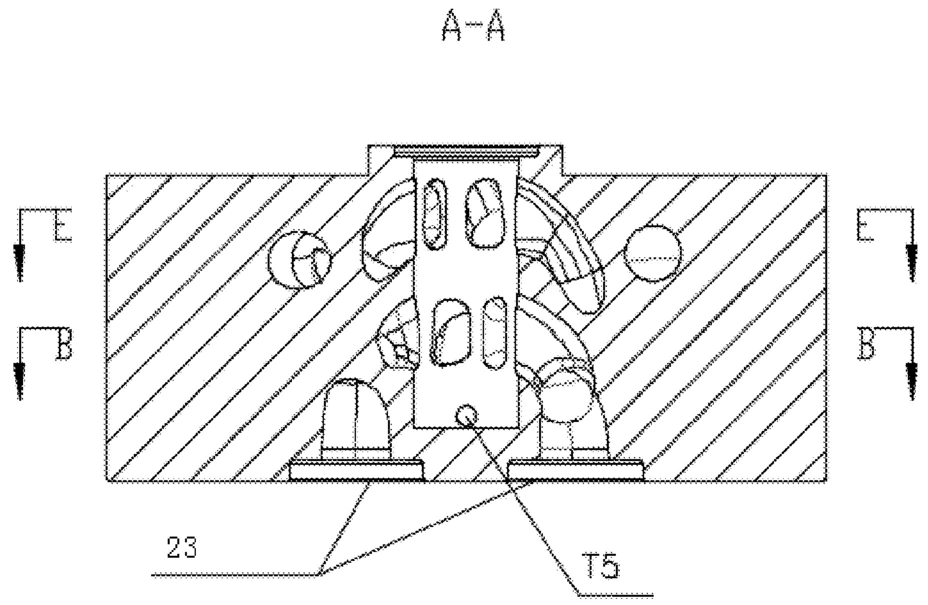
FIG. 3 is a structural schematic diagram of a valve body in a rotary servo valve.

In figures: Casing 1, Motor stator 2, End cover 3, Plug 4, PCBA circuit board 5, Magnetic encoder 6, Bearing 2 7, Permanent magnet 8, Bearing 1 9, Valve sleeve 10, O-ring 1 11, Valve body 12, Rotor valve core 13, O-ring 2 14, Limit slot 15, Bearing mounting hole 16, O-ring mounting slot 17, Valve sleeve sharp edge sealing line 18, Magnetic encoder mounting hole 19, Bearing mounting column 20, Permanent magnet mounting column 21, Limit structure 22, Bottom oil port 23, Circular arc slot 24, Sealing line cover 25, Valve core sharp edge sealing line 26, Vulcanized rubber slot 27.

DETAILED DESCRIPTION

The following will clearly and completely describe technical solutions in embodiments of this disclosure in conjunction with accompanying drawings in the embodiments of this disclosure. Obviously, the described embodiments are merely a part of the embodiments of this disclosure, not all of them. Based on the embodiments of this disclosure, all other embodiments obtained by those ordinary skilled in the art without making any creative labor are within a protection scope of this disclosure.

Please refer to FIGS. 1-18. In the embodiments of this disclosure, a rotary servo valve includes a casing 1 and a valve body 12, where the valve body 12 is mounted and fixed inside the casing 1, a rotor valve core 13 is provided inside the valve body 12, a valve sleeve 10 is provided on the rotor valve core 13, and an O-ring 1 11 is provided on a lower end of the valve body 12;

- an end cover 3 is provided on an upper end of the casing 1, a PCBA circuit board 5 is provided inside the end cover 3, and a plug 4 is provided on an upper end of the end cover 3; and
- a bearing 1 9 is provided on an upper right side of the valve body 12, a permanent magnet 8 is provided on an upper end of the bearing 1 9, an O-ring 2 14 is provided on a left side of the bearing 1 9, a motor stator 2 is provided on an upper left side of the O-ring 2 14, a bearing 2 7 is provided on an upper side of the permanent magnet 8, and a magnetic encoder 6 is provided on a left side of the bearing 2 7.

A bearing mounting hole 16 is provided inside the valve sleeve 10, two symmetrical limit slots 15 are provided on both sides of an upper side of the bearing mounting hole 16, an O-ring mounting slot 17 is provided on an outer upper side of the valve sleeve 10, a sharp edge sealing line 18 is provided on a lower side of the valve sleeve 10, and a vulcanized rubber slot 27 horizontally and vertically communicated is provided on a lower surface of the valve sleeve 10.

A permanent magnet mounting column 21 is provided on an upper end of the rotor valve core 13, a bearing mounting column 20 is provided on an upper end of the permanent magnet mounting column 21, a magnetic encoder mounting hole 19 is provided on a lower side inside the bearing mounting column 20, and the magnetic encoder 6 is mounted inside the magnetic encoder mounting hole 19. Two limit structures 22 are provided on a middle position of an outer side of the rotor valve core 13, the two limit structures 22 are provided in a central symmetrical structure, and a valve core sharp edge sealing line 26 is provided on a lower side of the rotor valve core 13.

Figure 4:
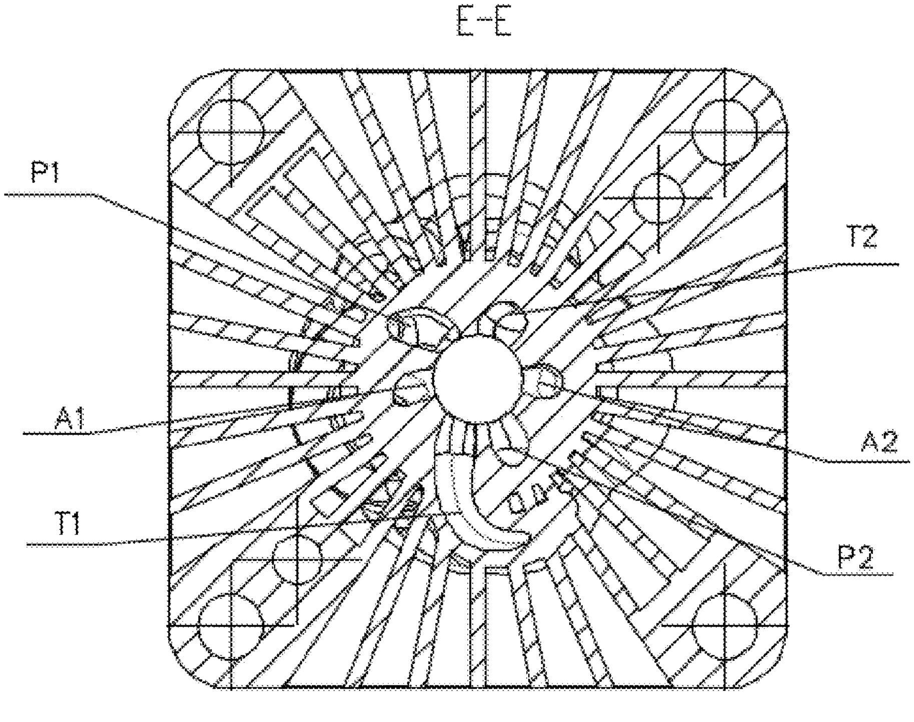
FIG. 4 is a cross-sectional schematic diagram of a valve body in a rotary servo valve in an E-E direction.
Figure 5:
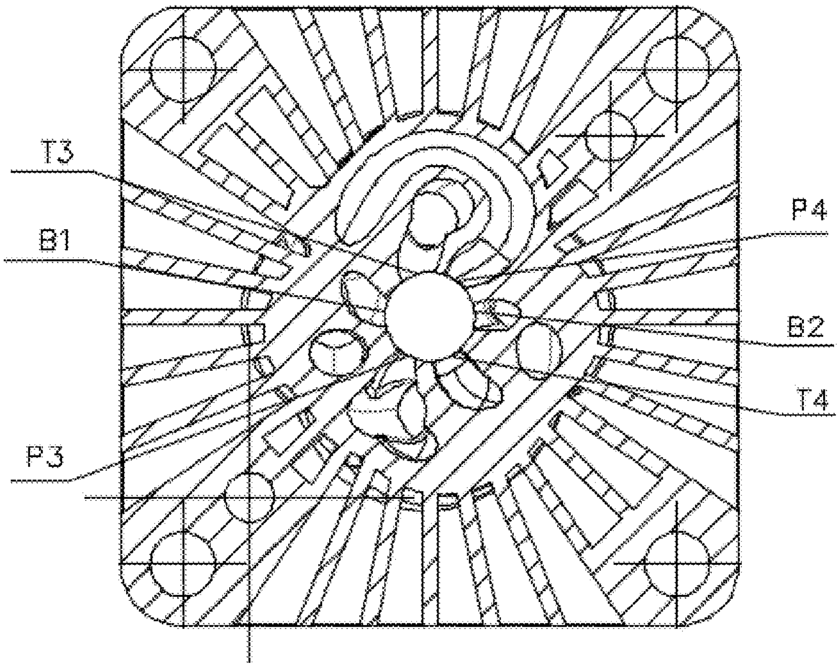
FIG. 5 is a cross-sectional schematic diagram of a valve body in a rotary servo valve in a B-B direction.
Figure 6:
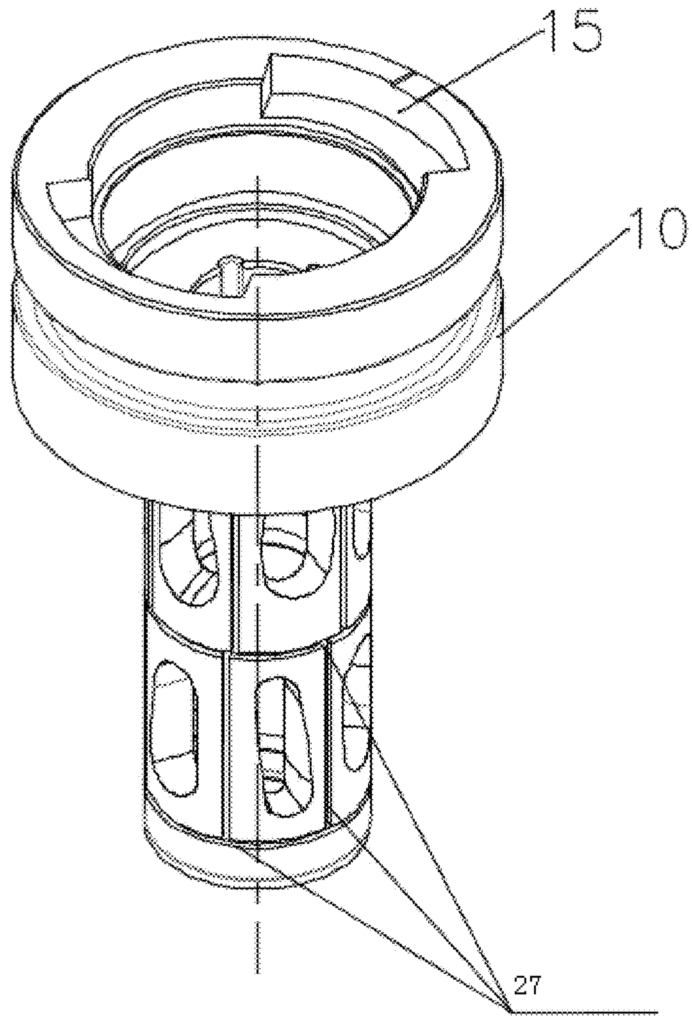
FIG. 6 is a structural schematic diagram of a valve sleeve in a rotary servo valve.
Figure 7:
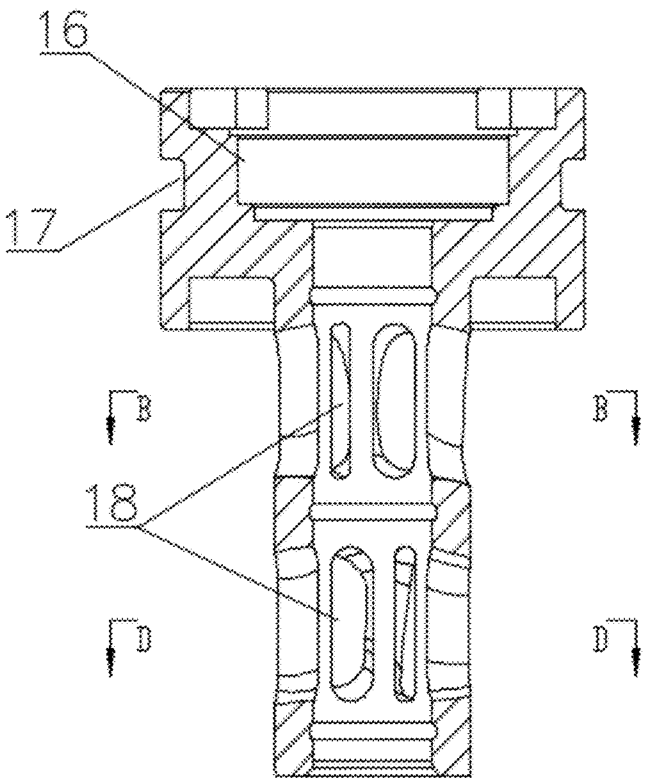
FIG. 7 is a cross-sectional schematic diagram of a valve sleeve in a rotary servo valve.
Figure 8:
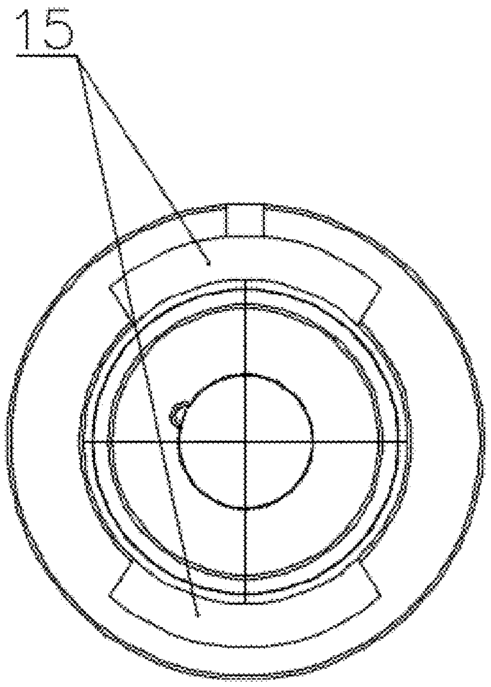
FIG. 8 is a top view of a valve sleeve in a rotary servo valve.
Figure 9:
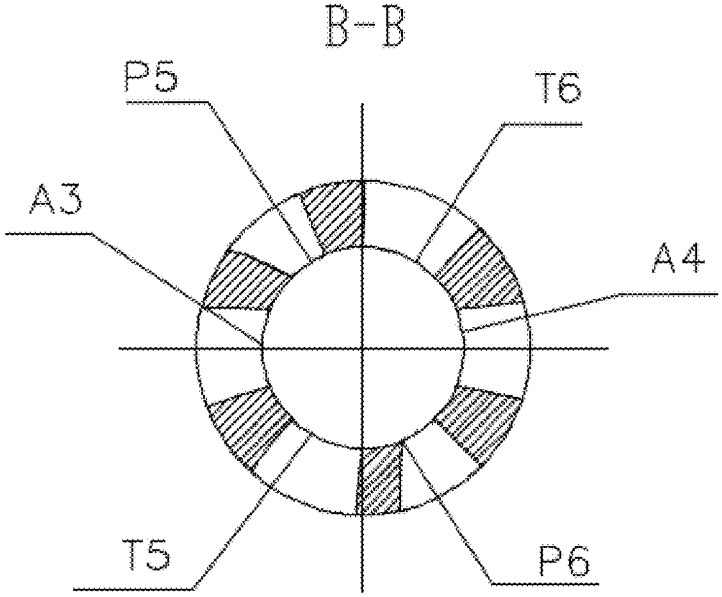
FIG. 9 is a cross-sectional schematic diagram of a valve sleeve in a rotary servo valve in a B-B direction.
Figure 10:
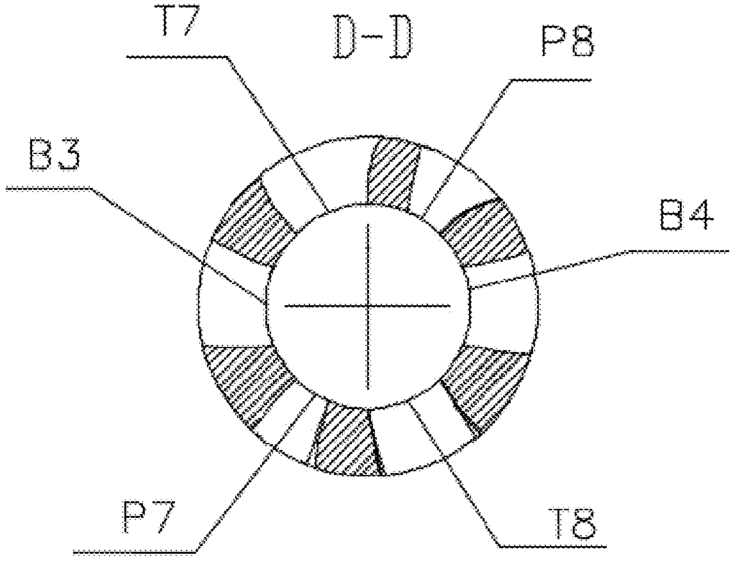
FIG. 10 is a cross-sectional schematic diagram of a valve sleeve in a rotary servo valve in a D-D direction.

A lower side of the valve body 12 is provided with bottom oil ports 23 on a left side and a right side, and the valve body 12 is 3D printed adopting a creative design. A bottom surface has four oil ports P, A, B, and T. The oil ports P, A, B, and T are communicated with waist shaped holes in an upper circumference and a lower circumference on the valve body through a 3D printed oil passage, as shown in FIGS. 4-5. The waist shaped holes in two circumferences on the valve body are distributed in a circular pattern around a mounting hole of the valve sleeve. An order of a first circumference is P1, A1, T1, P2, A2, T2, and an order of a second circumference is P3, B1, T3, P4, B2, T4, where Pn is communicated with P, An is communicated with A, Bn is communicated with B, Tn is communicated with T, and the valve body includes a port T5 communicated with bottom, where the port T5 is communicated with the port T.

Four O-rings 1 11, are mounted on ports P, A, B, and T of a bottom plate of the valve body for sealing. The valve body 12 is integrally formed adopting 3D printing, the valve sleeve 10 is mounted into a main hole of the valve body 12, and the rotor valve core 13 is printed and processed as a whole with the motor rotor. The bearing 1 9 and the bearing 2 7 are mounted on both ends of the rotor valve core 13, and the rotor valve core 13 and the valve sleeve 10 have a clearance fit. The motor stator 2 is mounted on the casing 1, and the permanent magnet 8 is mounted on the rotor valve core 13. The casing 1 is fixed to the valve body 12 by screws, the end cover 3 is fixed to the casing 1 by the screws, and the PCBA circuit board 5 is fixed inside the end cover 3 by the screws. When the motor is powered on, the rotor valve core 13 is driven to rotate, and the magnetic encoder 6 is used to feedback on an angle rotated by the rotor valve core 13 to achieve precise closed-loop control.

FIGS. 6-10 show structural schematic diagrams of the valve sleeve 10. The valve sleeve 10 is 3D printed adopting the creative design. There are two circumferences of waist shaped holes distributed in the circular pattern on the inner circle and the outer circle of the valve sleeve 10, waist shaped holes along a counterclockwise direction of a first circumference are P5, A3, T5, P6, A4, T6 in sequence, and waist shaped holes along the counterclockwise direction of a second circumference are T7, B3, P7, T8, B4, P8 in sequence, where Pn is communicated with Pn-4 corresponding to the valve body in a close fit, An is communicated with An-2 corresponding to the valve body in a close fit, Bn is communicated with Bn-2 corresponding to the valve body in a close fit, Tn is communicated with Tn-4 corresponding to the valve body in a close fit, and waist shaped holes on an inner cylindrical surface are symmetrically distributed. The valve sleeve sharp edge sealing line 18 and the valve core sharp edge sealing line 26 ensure a certain amount of coverage, achieving a sealing effect. The O-ring mounting slot 17 is used to mount an O-ring, and the bearing mounting hole is used to mount and fix a bearing. A slot surface of the vulcanized rubber slot 27 is rough.

Among them, among the waist shaped holes along the counterclockwise direction of the first circumference, P5 and P6 are a pair of small holes, and A3 and A4, T5 and T6 are two pairs of large holes, and among the waist shaped holes along the counterclockwise direction of the second circumference, P7 and P8 are a pair of small holes, and B3 and B4, T7 and T8 are two pairs of large holes.

Figure 11:
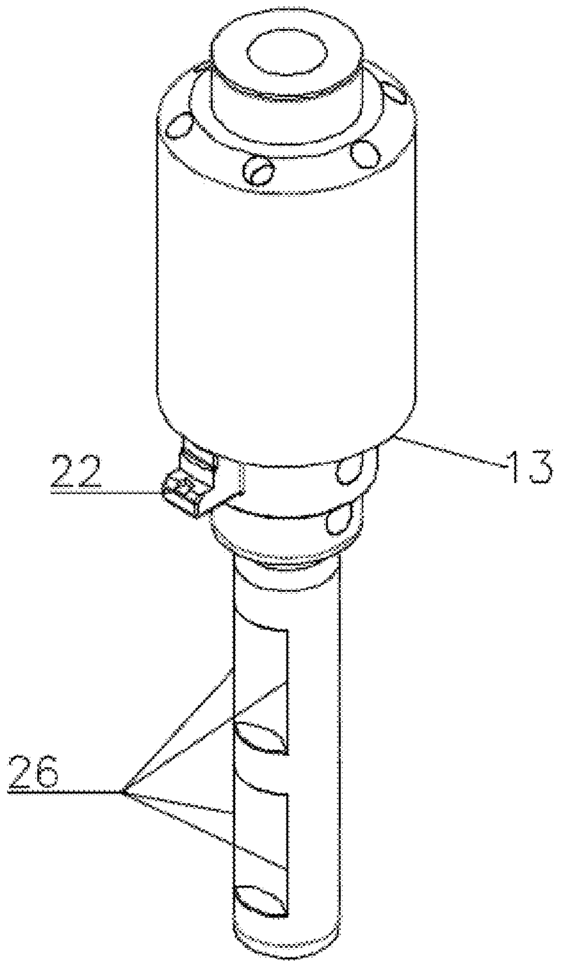
FIG. 11 is a structural schematic diagram of a rotor valve core in a rotary servo valve.
Figure 12:
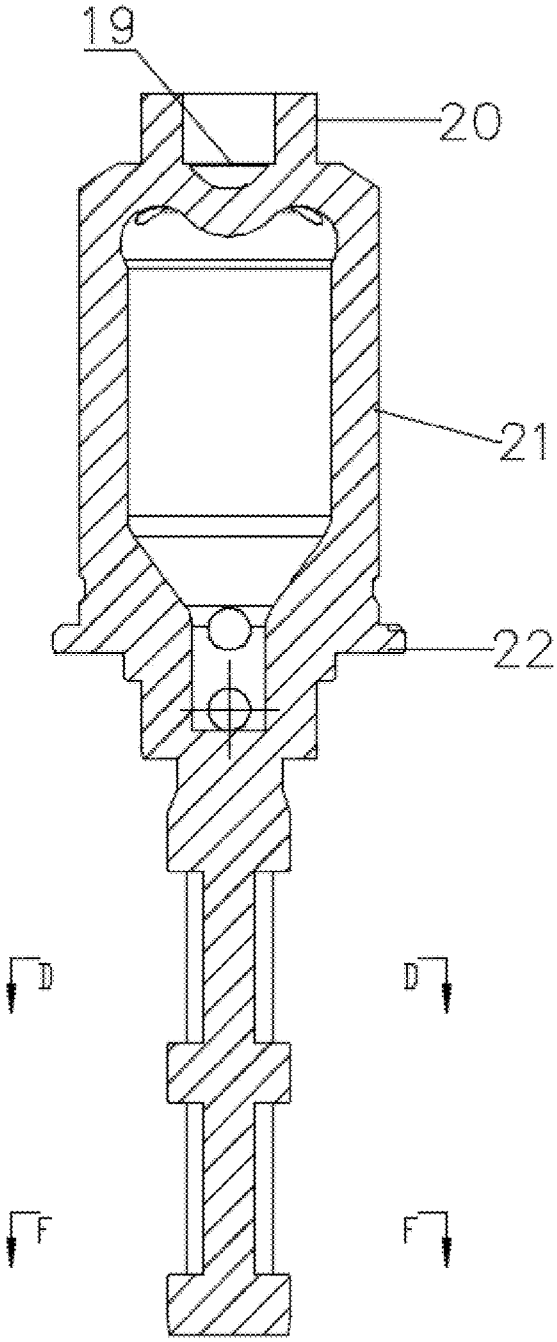
FIG. 12 is a cross-sectional schematic diagram of a rotor valve core in a rotary servo valve.
Figure 13:
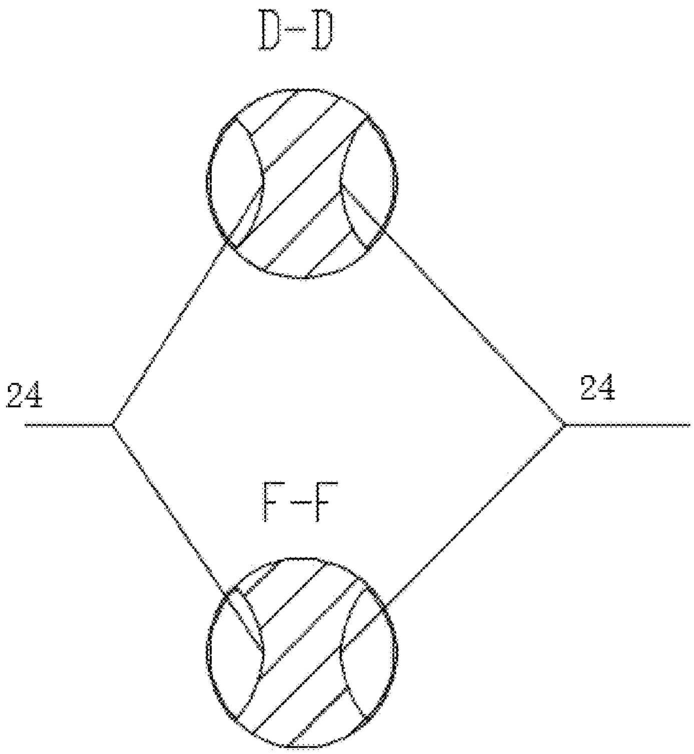
FIG. 13 is a schematic diagram of a rotor valve core in a rotary servo valve in a D-D direction and an F-F direction.

FIGS. 11-13 are structural schematic diagrams of the rotor valve core. The rotor valve core is 3D printed adopting the creative design. This process can process a hollow structure while ensuring mechanical strength of a rotor, and minimize a weight of the rotor valve core, thereby obtaining smaller motor rotor inertia and making response speed faster. Four circular arc slots 24 are symmetrically provided on an upper end and a lower end of a cylindrical surface of the rotor valve core. There are eight corresponding valve core sharp edge sealing lines 26 for plus lap with sealing lines of the valve sleeve. The limit structure 22 is configured to limit a rotation angle of the rotor. A magnetic ring is mounted on the rotor. A material of the magnetic ring is sintered neodymium iron boron, and this material has a strong magnetic energy product. That is to say, less material may be used to output a same magnetic force, thereby reducing a weight of the motor rotor. In addition, a structure of the magnetic ring eliminates a risk of detachment, reduces distance between two magnetic poles, improves cogging torque of the motor, and enhances accuracy of the motor and a valve. An upper bearing and a lower bearing are mounted on a bearing mounting seat. In addition, the rotor valve core is also designed with a double symmetrical limit, which not only provides double protection, but also results in better dynamic balance performance of the motor rotor, smoother valve operation, and higher accuracy.

Figure 14:
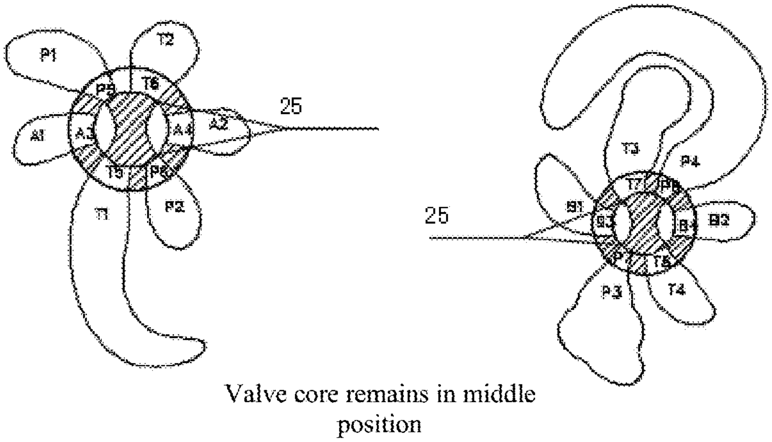
FIG. 14 is a schematic diagram of oil flowing through an oil port after a valve core rotates in a rotary servo valve.
Figure 14:
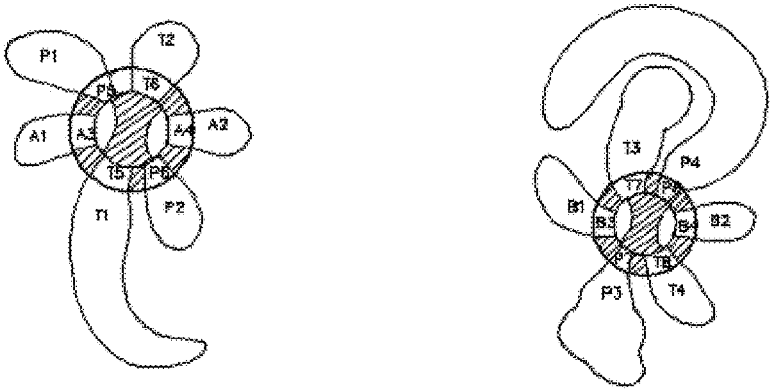
Figure 14:
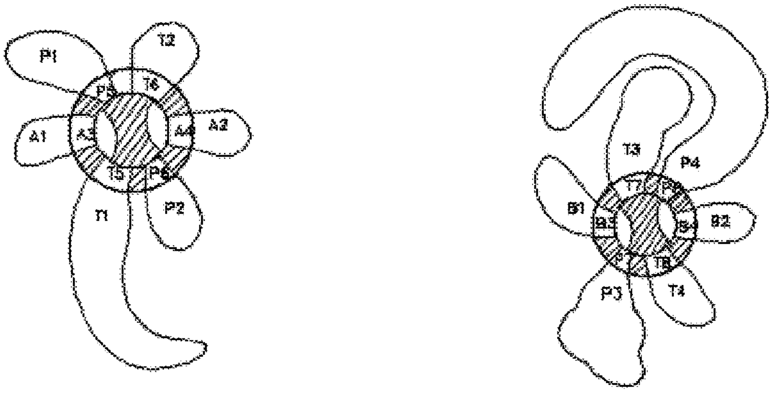

FIG. 14 is a schematic diagram of oil flowing through an oil port after a valve core rotates in a rotary servo valve. When in a middle position, the oil ports P, T, A, and B are all closed and sealed with sealing lines. After the valve core rotates counterclockwise, P and A are opened, and B and T are opened. After the valve core rotates clockwise, P and B are opened, and A and T are opened. In this way, the motor may drive the valve core to rotate and freely control opening and closing states of P, T, A, and B, thereby achieving direction change and precise control.

Figure 15:
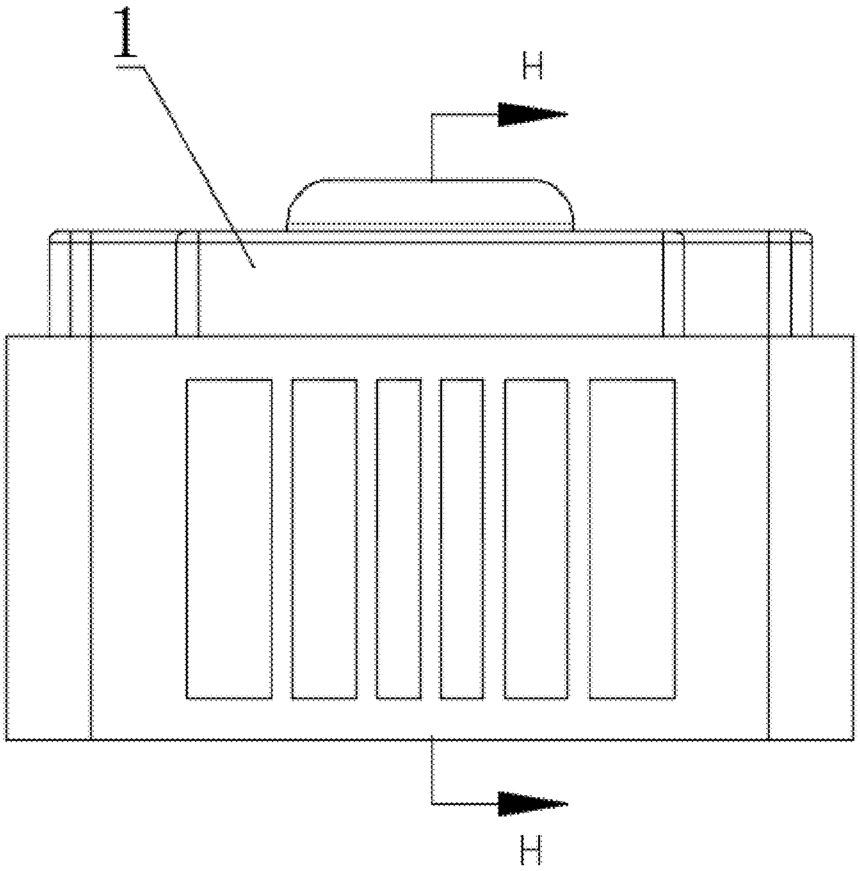
FIG. 15 is a structural schematic diagram of a casing in a rotary servo valve.
Figure 16:
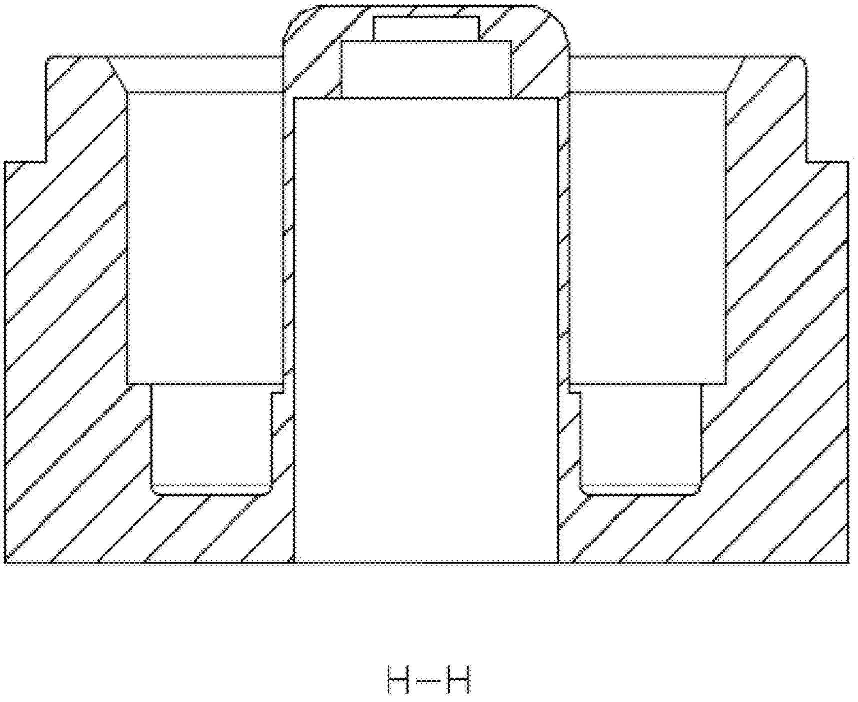
FIG. 16 is a cross-sectional schematic diagram of a casing in a rotary servo valve.

FIGS. 15-16 show schematic diagrams of an integrated motor casing. This component is integrally formed and effectively isolates a path connecting the motor stator and the rotor, eliminating a risk of oil leakage from a rotor end to a stator end.

Adopting a fluid region of a structural simulation model in this disclosure, hydraulic oil enters from two ports below, flows through a throttling area of the valve core in the middle, and flows out from the other two ports. Compared with an original model, a structure of the valve core is a crescent shape, with an increased flow area. An inner diameter of a pipeline downstream of the valve core has also nearly doubled. Optimization of these two structures can reduce pressure loss of the model and increase a flow rate of the valve.

A polyhedra grid method is adopted to partition the model. In order to accurately calculate, ten layers of boundary layers are set up for all wall surfaces, with a growth rate of 1.2. The number of grids is 687,198 and grid quality is 0.2, and the grid quality meets requirements.

Figure 17:
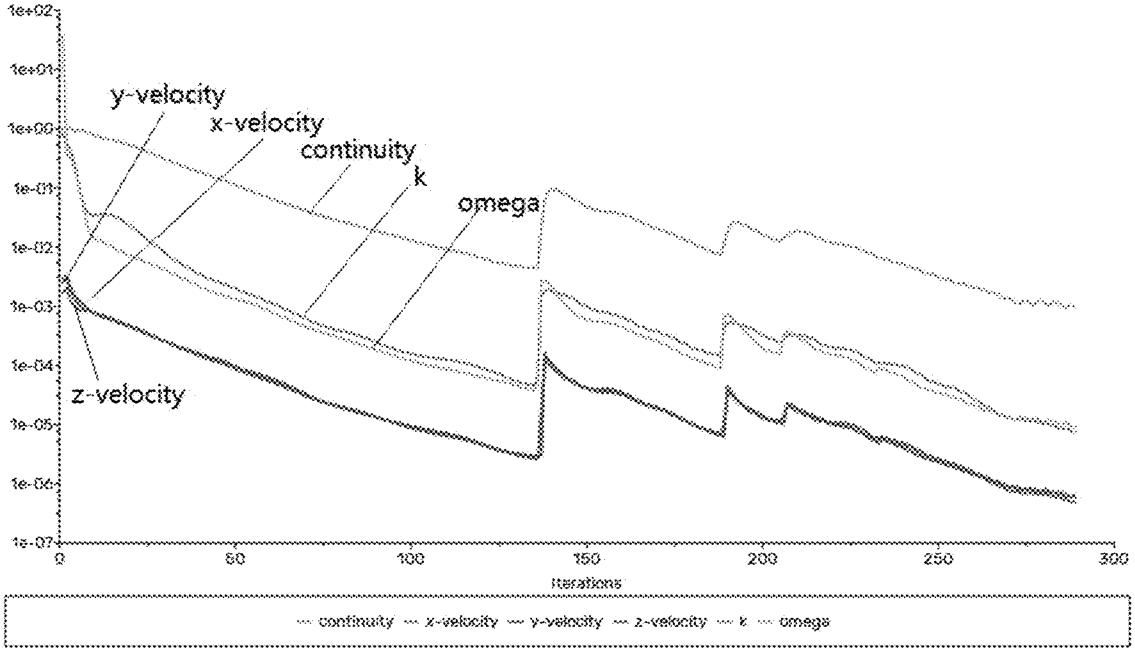
FIG. 17 shows a residual plot of an SST turbulence model during a calculation process used in embodiments.

An SST turbulence model is adopted for calculation. At an inlet, total pressure is set to 7 MPa, and at an outlet, it is set to atmospheric pressure. Roughness of a wall surface is set to 6.3 μm. A residual plot during a calculation process is shown in FIG. 17, and it may be seen that residual is less than 1e-3 and calculation converges.

Figure 18:
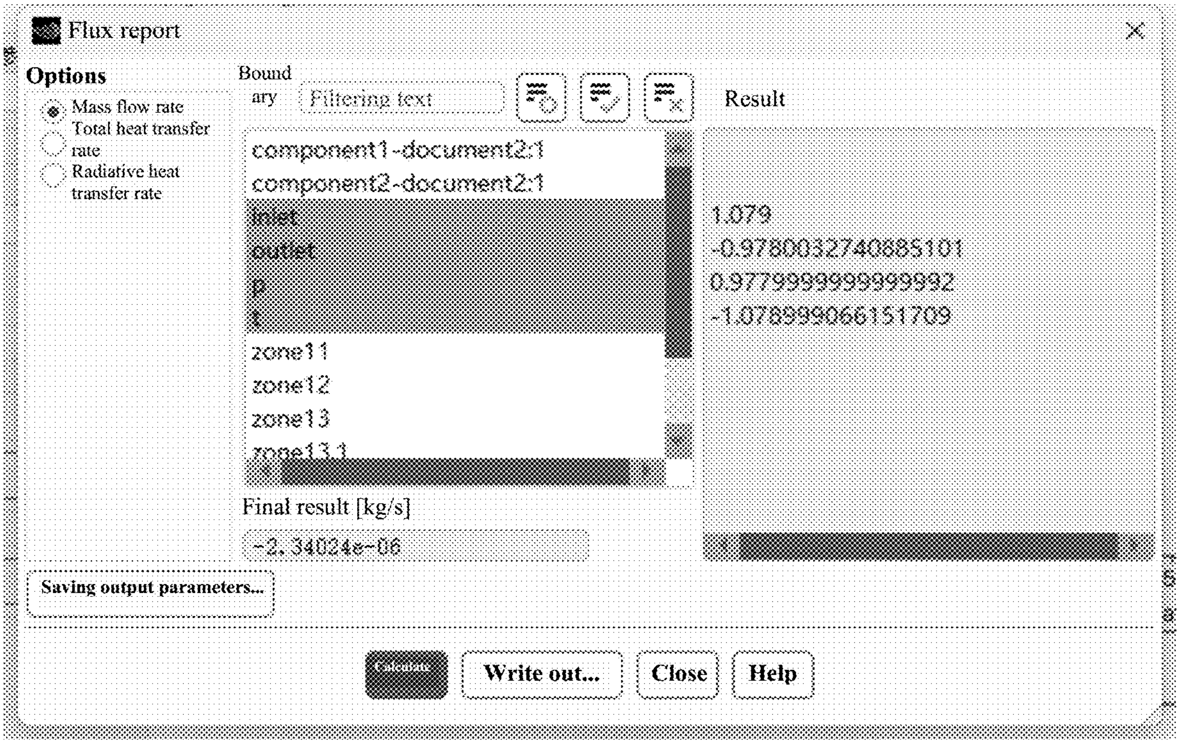
FIG. 18 is a screenshot of a flow rate calculation result of an optimization model in embodiments.

An analysis of a calculation result is as follows. A flow rate calculation result of an optimization model is shown in FIG. 18. A mass flow rate of the port P is 0.98 kg/s, and a volume flow rate is 65.93 L/min, increasing 74.65% compared to the original model. A mass flow rate of the port T is 1.08 kg/s, and a volume flow rate is 72.74 L/min, increasing 57.51% compared to the original model.

This study optimized a structure of the valve core and a downstream pipe diameter based on the original model, established a new model, and simulated and calculated the original model and the optimization model separately while ensuring consistency in other aspects. Calculation results are summarized as follows.

I. A mass flow rate of the port P of the original model is 0.56 kg/s, and a volume flow rate is 37.75 L/min. A mass flow rate of the port T of the original model is 0.68 kg/s, and a volume flow rate is 46.18 L/min.

II. A mass flow rate of the port P of the optimization model is 0.98 kg/s, and a volume flow rate is 65.93 L/min, increasing 74.65% compared to the original mode. A mass flow rate of the port T is 1.08 kg/s, and a volume flow rate is 72.74 L/min, increasing 57.51% compared to the original model.

It can be seen that an optimization effect is quite obvious, and the optimization model has greatly improved compared to the original model.

The above are merely preferred specific implementation manner of this disclosure, but a protection scope of this disclosure is not limited thereto. Within a technical scope disclosed in this disclosure, any equivalent replacements or changes made by those skilled familiar with the art based on technical solutions and inventive concepts thereof of this disclosure shall be covered within the protection scope of this disclosure.

The invention claimed is:

1. A rotary servo valve, comprising a casing (1) and a valve body (12), wherein the valve body (12) is mounted and fixed inside the casing (1), a rotor valve core (13) is provided inside the valve body (12), a valve sleeve (10) is provided on the rotor valve core (13), and an O-ring 1 (11) is provided on a lower end of the valve body (12);

an end cover (3) is provided on an upper end of the casing (1), a PCBA circuit board (5) is provided inside the end cover (3), and a plug (4) is provided on an upper end of the end cover (3); and a bearing 1 (9) is provided on an upper right side of the valve body (12), a permanent magnet (8) is provided on an upper end of the bearing 1 (9), an O-ring 2 (14) is provided on a left side of the bearing 1 (9), a motor stator (2) is provided on an upper left side of the O-ring 2 (14), a bearing 2 (7) is provided on an upper side of the permanent magnet (8), and a magnetic encoder (6) is provided on a left side of the bearing 2 (7).

2. The rotary servo valve according to claim 1, wherein a bearing mounting hole (16) is provided inside the valve sleeve (10), two symmetrical limit slots (15) are provided on both sides of an upper side of the bearing mounting hole (16), an O-ring mounting slot (17) is provided on an outer upper side of the valve sleeve (10), a sharp edge sealing line (18) is provided on a lower side of the valve sleeve (10), and a vulcanized rubber slot (27) horizontally and vertically communicated is provided on a lower surface of the valve sleeve (10).

3. The rotary servo valve according to claim 1, wherein a permanent magnet mounting column (21) is provided on an upper end of the rotor valve core (13), a bearing mounting column (20) is provided on an upper end of the permanent magnet mounting column (21), a magnetic encoder mounting hole (19) is provided on a lower side inside the bearing mounting column (20), and the magnetic encoder (6) is mounted inside the magnetic encoder mounting hole (19).

4. The rotary servo valve according to claim 3, wherein two limit structures (22) are provided on a middle position of an outer side of the rotor valve core (13), the two limit structures (22) are provided in a central symmetrical structure, and a valve core sharp edge sealing line (26) is provided on a lower side of the rotor valve core (13).

5. The rotary servo valve according to claim 1, wherein the motor stator (2) is mounted on the casing (1), the permanent magnet (8) is mounted on the rotor valve core (13), the casing (1) is fixed to the valve body (12) by screws, the end cover (3) is fixed to the casing (1) by the screws, and the PCBA circuit board (5) is fixed inside the end cover (3) by the screws.

6. The rotary servo valve according to claim 1, wherein four circular arc slots (24) are symmetrically provided at an upper end and a lower end of a cylindrical surface of the rotor valve core (13).

7. The rotary servo valve according to claim 1, wherein the valve sleeve (10) is 3D printed, and there are two circumferences of waist shaped holes distributed in a circular pattern on an inner circle and an outer circle of the valve sleeve (10).

8. The rotary servo valve according to claim 1, wherein the rotor valve core (13) is made by 3D printing.

9. The rotary servo valve according to claim 1, wherein there are two circumferences of waist shaped holes distributed in a circular pattern on an inner circle and an outer circle of the valve sleeve (10), waist shaped holes along a counterclockwise direction of a first circumference are (P5, A3, T5, P6, A4, T6) in sequence, and waist shaped holes along the counterclockwise direction of a second circumference are (T7, B3, P7, T8, B4, P8) in sequence; wherein Pn is communicated with Pn-4 corresponding to the valve body in a close fit, An is communicated with An-2 corresponding to the valve body in a close fit, Bn is communicated with Bn-2 corresponding to the valve body in a close fit, Tn is communicated with Tn-4 corresponding to the valve body in a close fit, and waist shaped holes on an inner cylindrical surface are symmetrically distributed; and wherein among the waist shaped holes along the counterclockwise direction of the first circumference, (P5, P6) are a pair of small holes, and (A3, A4), (T5, T6) are two pairs of large holes, and among the waist shaped holes along the counterclockwise direction of the second circumference, (P7, P8) are a pair of small holes, and (B3, B4), (T7, T8) are two pairs of large holes.

* * * * *